United States Patent
Luo et al.

(10) Patent No.: US 12,184,476 B2
(45) Date of Patent: Dec. 31, 2024

(54) USER EQUIPMENT AND BEAM FAILURE RECOVERY METHOD

(71) Applicant: SHARP KABUSHIKI KAISHA, Sakai (JP)

(72) Inventors: Chao Luo, Shanghai (CN); Shohei Yamada, Sakai (JP); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 247 days.

(21) Appl. No.: 17/044,668

(22) PCT Filed: Apr. 2, 2019

(86) PCT No.: PCT/CN2019/081008
§ 371 (c)(1),
(2) Date: Oct. 1, 2020

(87) PCT Pub. No.: WO2019/192476
PCT Pub. Date: Oct. 10, 2019

(65) Prior Publication Data
US 2021/0105172 A1    Apr. 8, 2021

(30) Foreign Application Priority Data

Apr. 4, 2018   (CN) .......................... 201810304715.4

(51) Int. Cl.
*H04L 12/24*       (2006.01)
*H04L 5/00*        (2006.01)
(Continued)

(52) U.S. Cl.
CPC ........ *H04L 41/0654* (2013.01); *H04L 5/0048* (2013.01); *H04W 74/0833* (2013.01)

(58) Field of Classification Search
CPC . H04B 7/0695; H04L 41/0654; H04L 5/0048; H04L 5/0053; H04W 74/0833; H04W 76/19
See application file for complete search history.

(56) References Cited

U.S. PATENT DOCUMENTS

2015/0223222 A1    8/2015  Irie et al.
2019/0245737 A1*   8/2019  Zhou ................... H04L 41/0668

OTHER PUBLICATIONS

ASUSTek ("Missing parts in the beam failure detection and recovery procedure"; R2-1804278; 3GPP TSG-RAN WG2 Meeting #101bis; Sanya, China, Apr. 16-20, 2018; retrieved from the internet: https://www.3gpp.org/ftp/TSG_RAN/WG2_RL2/TSGR2_101bis/Docs/; retrieved on Apr. 3, 2018) (Year: 2018).*

(Continued)

*Primary Examiner* — Melvin C Marcelo
*Assistant Examiner* — Natali Pascual Peguero
(74) *Attorney, Agent, or Firm* — ScienBiziP, P.C.

(57) ABSTRACT

The present invention provides user equipment (UE) and a beam failure recovery method. In the beam failure recovery method executed by UE, a physical layer entity of the UE measures a reference signal and indicates a beam failure instance to a MAC layer entity of the UE; each time the MAC layer entity receives the indication of the beam failure instance, the MAC layer entity starts a beam failure detection timer, determines whether the received beam failure instances are consecutively generated, and uses a beam failure instance counter to count the number of beam failure instances consecutively generated; when the counted number exceeds a preset threshold, it is determined that a beam failure has occurred; the UE initiates a random access procedure, and selects a contention-free random access resource or a contention-based random access resource in the random access procedure.

2 Claims, 5 Drawing Sheets

(51) Int. Cl.
*H04L 41/0654* (2022.01)
*H04W 74/08* (2024.01)
*H04W 74/0833* (2024.01)

(56) References Cited

OTHER PUBLICATIONS

NTT Docomo, "New SID Proposal: Study on New Radio Access Technology", RP-160671, 3GPP TSG RAN Meeting #71, Göteborg, Sweden, Mar. 7-10, 2016.
"3rd Generation Partnership Project; Technical Specification Group Radio Access Network; NR; Medium Access Control (MAC) protocol specification(Release 15)", 3GPP TS 38.321 V15.1.0 (Mar. 2018).
Nokia et al., "Beam failure detection and recovery", R2-1803230, 3GPP TSG-RAN WG2 Meeting #101, Athens, Greece, Feb. 26-Mar. 2, 2018.
Samsung, "General corrections on TS 38.321", R2-1803854, 3GPP TSG-RAN2 Meeting #101, Athens, Greece, Feb. 26, 2018-Mar. 2, 2018.
Asustek, "Missing parts in the beam failure detection and recovery procedure", R2-1804278 3GPP TSG-RAN WG2 Meeting #101bis, Sanya, China, Apr. 16-20, 2018.

* cited by examiner

USER EQUIPMENT AND BEAM FAILURE RECOVERY METHOD

TECHNICAL FIELD

The present invention relates to the technical field of wireless communications, and in particular, to user equipment and a beam failure recovery method.

BACKGROUND

In March 2016, at the 3rd Generation Partnership Project (3GPP) RAN #71 Plenary Session, a new research project on 5G technology standards (see Non-Patent Document 1) was approved. The goal of the research project is to develop a New Radio (NR) access technology to meet all of the application scenarios, requirements, and deployment environments of 5G. NR mainly has three application scenarios: Enhanced Mobile Broadband Communication (eMBB), massive Machine Type Communication (mMTC), and Ultra Reliable and Low Latency Communication (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

A big difference between 5G and 4G is that 5G supports bands higher than 6 GHz (up to 100 GHz). In these bands, the path loss of the wireless signal is very high, which greatly reduces the signal coverage. The solution to this problem is to utilize large-scale antenna arrays and beam forming (also known as beamforming). Beamforming is a signal processing technique that combines signals transmitted to individual antenna elements in an antenna array so that the signals strengthen each other in certain directions and cancel each other in certain directions, thereby concentrating all the energy of the electromagnetic radiation in a given direction (referred to as a "beam").

Beams operating at high frequencies are prone to signal blockage due to movement and rotation of user equipment (UE), obstacles, and so on. This is referred to as a beam failure in 5G systems. In order to recover from the beam failure, a base station can configure some reference signals such as Channel State Information-Reference Signals (CSI-RSs) or Synchronization Signal/Physical Broadcast Channel (SS/PBCH) blocks (SSBs) for the UE in a connected state. Each reference signal resource can use the same beam as used by one of Control Resource Sets (CORESETs) which the UE is monitoring (the base station can configure for the UE one or a plurality of CORESETs used for monitoring PDCCH channels, which are referred to as "serving CORESETs" or "operating CORESETs"; and the beams used by these CORESETs may be referred to as "serving beams," or "operating beams"). The UE determines the link quality corresponding to the respective beams by measuring the reference signals. If the measured values (indicated by an error probability) of all the reference signals used for beam failure detection which the UE is monitoring are all greater than a threshold, the UE considers that a "beam failure instance" has occurred. A Radio Resource Control (RRC) parameter is defined in the system: beamFailureInstanceMaxCount; if the number of beam failure instances consecutively occurred (stored in a beam failure instance counter, referred to as BFI_COUNTER herein) is greater than the beamFailureInstanceMaxCount, it is considered that a beam failure has occurred.

After the UE determines that a beam failure has occurred, it can initiate a "beam failure recovery" procedure. The procedure may include a random access procedure, which generally includes the following steps (refer to FIG. 5 for details). FIG. 5 shows one example of a flowchart of the random access procedure in the prior art.

Step S51: Initialize the random access procedure. In this step, the UE initializes a series of parameters according to an RRC configuration, such as a maximum number of transmissions of a random access preamble, etc. In addition, the UE also initializes a series of variables that need to be used in the subsequent random access procedure, for example, a PREAMBLE_INDEX is used to store an index of a random access preamble to be selected in a random access resource selection step.

Step S52: Select a random access resource. In this step, for the random access procedure initiated for beam failure recovery, if contention-free random access resources are configured for beam failure recovery and corresponding reference signals (such as SSBs and/or CSI-RSs, each reference signal being associated with one beam) are associated, and at least one reference signal whose measurement value (such as Reference Signal Received Power, RSRP) is higher than a preset threshold is present in a reference signal set configured for candidate beams, one reference signal is selected from reference signals that meet the above conditions, and "contention-free" random access resources (including resources such as time, frequency, and random access preambles) associated with the reference signal. If no reference signal meets the above conditions, the same criteria as for initial access are used to select "contention-based" random access resources.

Step S53: Transmit a random access preamble. In this step, the UE transmits a random access preamble on the random access resources selected in the previous step at certain transmitting power.

Step S54: Receive a random access response. In this step, the UE initiates a random access response (time) window, and monitors within this window a response transmitted by the base station. If a contention-free random access preamble is transmitted in the previous step, and the received response contains an identifier of the UE, it is considered that the random access procedure has succeeded. If a contention-based random access preamble is transmitted in the previous step, and the received response contains an identifier of the transmitted random access preamble, an uplink grant (UL grant) in the response is decoded, and an uplink message (also referred to as Msg3) is transmitted according to resources allocated in the grant. If the base station does not receive the response successfully and the number of retransmissions does not reach a preset threshold, return to step S52 after a period of backoff.

Step S55: Resolve contention. In this step, if a response is received from the base station and a contention resolution identifier contained therein matches that transmitted in the Msg3, it is considered that contention (or conflict) has been resolved. If the contention is not resolved successfully, return to step S52 after a period of backoff.

Step S56: Complete the random access procedure. In this process, the UE does some cleanup work, such as clearing corresponding buffers.

The above procedure involves the interaction between a lower layer entity (such as a physical layer entity) and a MAC (Medium Access Control) layer entity in a 5G system. For example, a lower layer entity of the UE measures a reference signal and indicates a "beam failure instance" to a MAC layer entity of the UE, and in order to ensure that the "beam failure instances" indicated by the lower layer entity of the UE are consecutively generated (that is, each time the lower layer entity of the UE detects a beam failure instance, conditions for generating the beam failure instance are all met, and the lower layer entity of the UE also indicates the beam failure instance to the MAC layer entity of the UE), the MAC layer entity of the UE starts (or restarts) a timer (beamFailureDetectionTimer) each time it receives the indication of the beam failure instance, and expiration of the timer indicates that the received beam failure instances are not consecutive, and the MAC layer entity of the UE can reset the BFI_COUNTER to zero.

For example, in the above procedure, the processing of the "beam failure instance" received by the MAC layer entity of the UE can be described as follows using the language in the MAC protocol:

```
1> if beam failure instance indication has been received from lower layers:
    2> start or restart the beamFailureDetectionTimer;
    2> increment BFI_COUNTER by 1;
    2> if BFI_COUNTER = beamFailureInstanceMaxCount + 1:
        3> initiate a Random Access procedure (see subclause 5.1) on the SpCell by applying
           the parameters configured in BeamFailureRecoveryConfig.
1> if the beamFailureDetectionTimer expires:
    2> set BFI_COUNTER to 0.
1> if the Random Access procedure is successfully completed (see subclause 5.1):
    2> consider the Beam Failure Recovery procedure successfully completed.
```

The processing of the MAC layer entity of the UE receiving the response from the base station to the "beam failure recovery request" can be described as follows using the language in the MAC protocol:

```
...
1> if notification of a reception of a PDCCH transmission is recieved from lower layers; and
1> if PDCCH transmission is addressed to the C-RNTI; and
1> if the contention-free Random Access Preamble for beam failure recovery request was
transmitted by the MAC entity:
    2> consider the Random Access procedure successfully completed.
```

The problem with the existing beam failure handling mechanism is that the UE may need to perform extensive unnecessary processing on beam failure instances. For example, when the UE determines that a beam failure has occurred, the MAC layer entity of the UE will immediately initiate a beam failure recovery procedure, such as a random access procedure; during this period of time in which the random access procedure has been initiated but not yet ended, the lower layer entity of the UE is quite likely to still continuously generate beam failure instances and report them to the MAC layer entity of the UE. This will cause the MAC layer entity of the UE to repeatedly perform processing on the beam failure instances, such as starting/restarting the timer beamFailureDetectionTimer, incrementing the BFI_COUNTER, and possibly triggering a beam failure recovery procedure again, that is, re-initiating one or a plurality of random access procedures. Although the prior art stipulates that there can only be one ongoing random access procedure in a MAC layer entity at any time, and when the UE is in an ongoing random access procedure, it can choose to ignore a newly initiated random access procedure (or interrupt the ongoing random access procedure), the above processing will still unnecessarily increase the processing overheads of the UE. In addition, in the existing beam failure handling mechanism, the BFI_COUNTER is only set to zero in an initial state and when the timer beamFailureDetectionTimer expires, which may cause the value of the BFI_COUNTER to fail to correctly reflect the beam failure status in some cases. Also, if a beam failure recovery timer (beamFailureRecoveryTimer) is introduced to the beam failure handling mechanism, the steps/time of the random access procedure initiated for beam failure recovery will be different depending on whether the random access resources selected based on the measurement results are contention-free or contention-based, and the timing value of the timer beamFailureRecoveryTimer cannot be set accurately.

Therefore, a method that can better handle beam failure instances at the MAC layer is desired.

PRIOR ART DOCUMENT

Non-Patent Document

Non-Patent Document 1: RP-160671, New SID Proposal: Study on New Radio Access Technology

SUMMARY

In order to address at least some of the above problems, the present invention provides user equipment and a beam failure recovery method which can avoid unnecessary processing overheads of UE.

One aspect of the present invention provides a beam failure recovery method, which is a beam failure recovery method for user equipment (UE). The beam failure recovery method comprises: measuring, by a physical layer entity of the UE, a reference signal and indicating a beam failure instance to a MAC layer entity of the UE; starting, by the MAC layer entity, a beam failure detection timer each time the MAC layer entity receives the indication of the beam failure instance, determining whether the received beam failure instances are consecutively generated, and using a beam failure instance counter to count the number of beam failure instances consecutively generated; determining, when the counted number exceeds a preset threshold, that a beam failure has occurred; and initiating, by the UE, a random access procedure, and selecting a contention-free random access resource or a contention-based random access resource in the random access procedure.

Preferably, when the MAC layer entity receives the indication of the beam failure instance, the MAC layer entity determines whether an ongoing random access procedure exists, and if the MAC layer entity determines that an ongoing random access procedure exists, the MAC layer entity exits processing of the beam failure instance indication, and the random access procedure is initiated for beam failure recovery.

Further, preferably the MAC layer entity initiates the random access procedure when the MAC layer entity determines, based on the value of the beam failure instance counter exceeding the preset threshold, that a beam failure has occurred and no ongoing random access procedure exists.

Furthermore, preferably the MAC layer entity transmits a beam failure instance activating instruction or a beam failure instance deactivating instruction to the physical layer entity through one of RRC signaling, MAC CE signaling, and DCI signaling, and the physical layer entity determines, according to the beam failure instance activating instruction or the beam failure instance deactivating instruction, whether to indicate the beam failure instance to the MAC layer entity.

The beam failure instance activating instruction is an instruction indicating that the physical layer entity needs to indicate the beam failure instance to the MAC layer entity, and the beam failure instance deactivating instruction is an instruction indicating that the physical layer entity does not need to indicate the beam failure instance to the MAC layer entity.

Additionally, if at least one of the conditions of establishment of an RRC connection, reestablishment of an RRC connection, success in beam failure recovery, failure in beam failure recovery, and receipt of a corresponding instruction from a higher layer is met, the MAC layer entity transmits the beam failure instance activating instruction or the beam failure instance deactivating instruction to the physical layer entity.

Also, preferably the UE resets the beam failure instance counter if at least one of the conditions of establishment of an RRC connection, reestablishment of an RRC connection, successful beam failure recovery, failed beam failure recovery, and determination of occurrence of a beam failure is met.

In addition, preferably, when the MAC layer entity determines that the beam failure has occurred, the MAC layer entity starts a beam failure recovery timer for monitoring whether the beam failure recovery procedure is successful, and the MAC layer entity stops the beam failure recovery timer when the MAC layer entity determines that the contention-free random access resource is not selected in the random access procedure initiated for beam failure recovery.

Further, preferably, before the MAC layer entity stops the beam failure recovery timer, the MAC layer entity checks whether the beam failure recovery timer is running, and the MAC layer entity stops the beam failure recovery timer only when the beam failure recovery timer is running.

According to another aspect of the present invention, user equipment (UE) is provided, comprising: a processor; and a memory, storing instructions, wherein the instructions, when executed by the processor, perform the beam failure recovery method as described above.

According to the beam failure recovery method of the present invention, UE does not need to perform extensive unnecessary processing on beam failure instances, thereby avoiding unnecessary processing overheads of the UE, and reducing the processing overheads of the UE.

BRIEF DESCRIPTION OF DRAWINGS

The above and other features of the present invention will be more pronounced through the following detailed description taken in conjunction with the accompanying drawings.

DETAILED DESCRIPTION OF EMBODIMENTS

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

In the following description, a 5G mobile communication system and its subsequently evolved versions are used as illustrative application environments to set forth a plurality of embodiments according to the present invention in detail. However, it is to be noted that the present invention is not limited to the following embodiments, and rather, it is applicable to many other wireless communication systems, such as a communication system later than 5G and a 4G mobile communication system earlier than the 5G.

Some terms involved in the present invention are described below. Unless otherwise specified, the terms used in the present invention adopt the definitions herein. The terms given in the present invention may be named differently in LTE, LTE-Advanced, LTE-Advanced Pro, NR, and later communication systems, but unified terms are adopted in the present invention. When applied to a specific system, the terms may be replaced with terms adopted in the corresponding system.

LTE-A: Long Term Evolution-Advanced
UE: User Equipment
CSI-RS: Channel State Information-Reference Signal
RS: Reference Signal
NR: New Radio
RRC: Radio Resource Control
MAC: Medium Access Control
MAC CE: MAC Control Element
DCI: Downlink Control Information
RAP: Random Access Preamble Unless otherwise specified, in all embodiments of the present invention, a "beam failure recovery procedure" refers to a series of steps that UE performs upon determining that a beam failure has occurred; a "random access procedure" refers to a random access procedure that the UE initiates for beam failure recovery upon determining that the beam failure has occurred.

Figure 1:
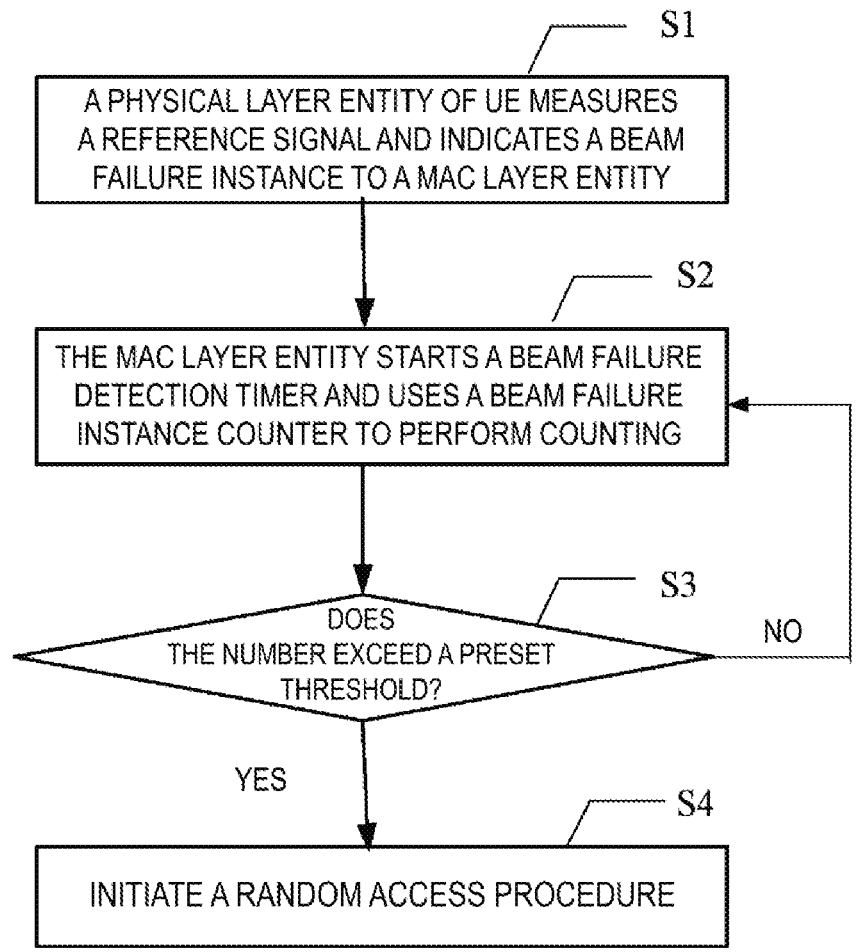
FIG. 1 is a flowchart of a beam failure recovery method for user equipment (UE).

FIG. 1 is a flowchart of a beam failure recovery method for user equipment (UE) according to the present invention.

In step S1, a lower layer entity of the UE measures reference signals and indicates a beam failure instance to a MAC layer entity.

In step S2, the MAC layer entity of the UE starts a beam failure detection timer each time the MAC layer entity receives the indication of the beam failure instance, determines whether the received beam failure instances are consecutively generated, and uses a beam failure instance counter to count the number of beam failure instances consecutively generated.

In step S3, it is determined whether the counted number exceeds a preset threshold, and if it exceeds the preset threshold (in the case of Yes), it is determined that a beam failure has occurred, and the process proceeds to step S4. When it is determined that the preset threshold is not exceeded (in the case of No), the process returns to step S2.

In step S4, the UE initiates a random access procedure, and selects a contention-free random access resource or a contention-based random access resource in the random access procedure. Unless otherwise specified, the steps involved in the random access procedure can adopt known technology (refer to FIG. 5).

Figure 2:
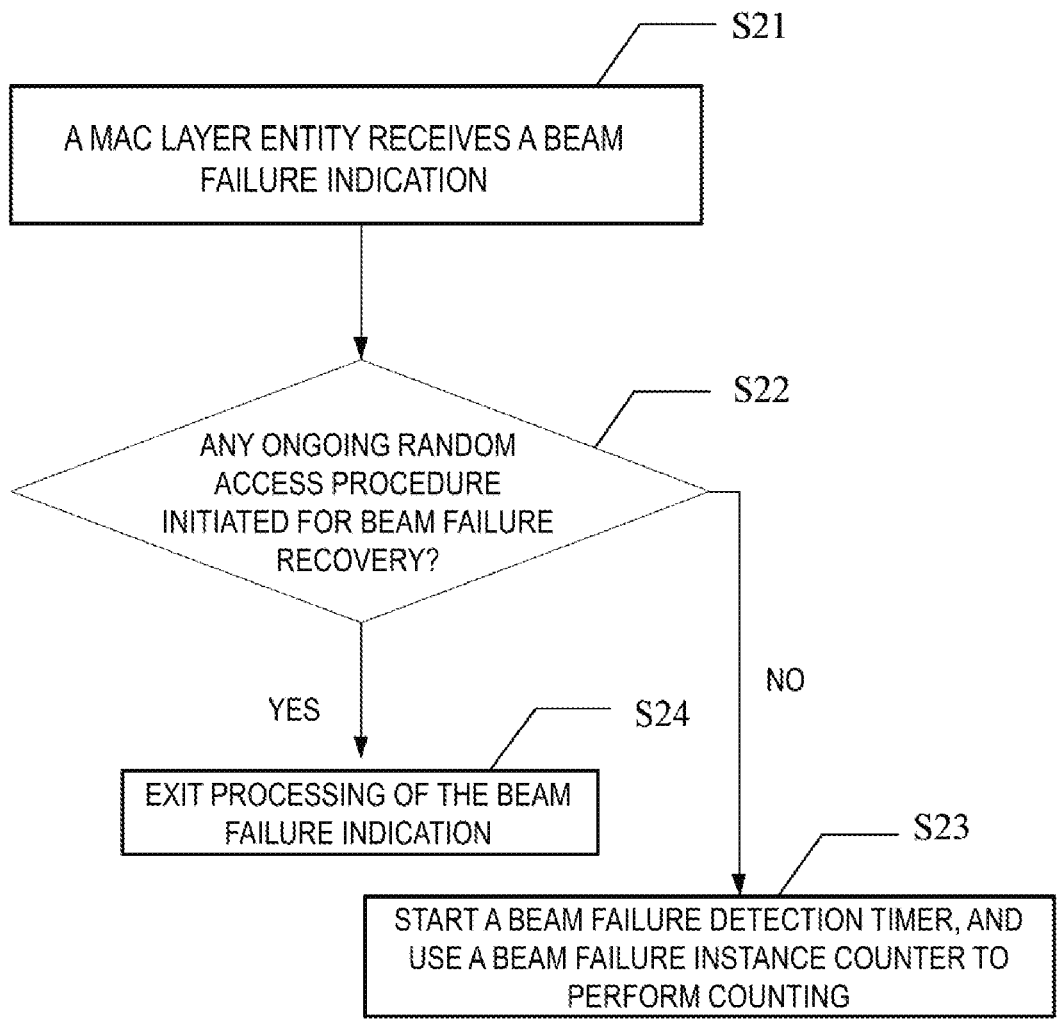
FIG. 2 is one example of a flowchart of a beam failure recovery method according to Embodiment 1 of the present invention.

FIG. 2 is one example of the beam failure recovery method according to Embodiment 1, and only parts different from those in FIG. 1 are shown herein.

In step S21, the MAC layer entity receives an indication of a beam failure instance. In step S22, it is determined whether there is an ongoing random access procedure initiated for beam failure recovery. In the case of "Yes," that is, if there is an ongoing random access procedure initiated for beam failure recovery, processing of the beam failure instance exits (step S24). In the case of "No," proceed to step S23 (i.e., step S2 in FIG. 1): start a beam failure detection timer, determine whether the received beam failure instances are consecutively generated, and use a beam failure instance counter to count the number of beam failure instances consecutively generated. The other steps thereafter are the same as steps S3 and S4 in FIG. 1.

Optionally, the aforementioned random access procedure may be a random access procedure initiated for some other purpose, such as a random access initiated because of a "PDCCH order," or a random access initiated because of a handover, or a contention-based random access, etc.

Optionally, the foregoing random access procedure may also be a random access procedure initiated for any purpose.

For example, using the language in the MAC protocol, one implementation of the scheme above can be described as follows:

```
1> if beam failure instance indication has been received from lower layers; and
1> if there is no outgoing Random Access procedure initiated for beam failure recovery:
    2> start or restart the beamFailureDetectionTimer,
    2> increment BFI_COUNTER by 1;
    2> if BFI_COUNTER = beamFailureInstanceMaxCount + 1:
        3> initiate a Random Access procedure (see subclause 5.1) on the SpCell by applying
           the parameters configured in BeamFailureRecoveryConfig.
1> if the beamFailureDetectionTimer expires:
    2> set BFI_COUNTER to 0.
1> if the Random Access procedure is successfully completed (see subclause 5.1):
    2> consider the Beam Failure Recovery procedure successfully completed.
```

In the following, specific embodiments are provided to illustrate other preferred implementations of the present invention.

Embodiment 1

In this embodiment, a MAC layer entity of UE processes a received beam failure instance only when there is no ongoing random access procedure initiated for beam failure recovery.

For example, when the UE receives an indication of a beam failure instance, it determines whether there is an ongoing random access procedure initiated for beam failure recovery in the MAC layer entity. If so, no other processing is performed on the beam failure instance, or if so, processing of the beam failure instance exits; if there is no ongoing random access procedure initiated for beam failure recovery, processing is performed according to the prior art, for example, starting or restarting a timer beamFailureDetectionTimer, incrementing a BFI_COUNTER, and initiating a random access procedure if the value of the BFI_COUNTER exceeds a preset threshold, and so on.

Optionally, when the MAC layer entity of the UE determines that a beam failure has occurred (for example, when the value of the BFI_COUNTER exceeds a preset threshold), the random access procedure is initiated only when there is no ongoing random access procedure initiated for beam failure recovery. In other words, the random access procedure is initiated only when the MAC layer entity of the UE determines that a beam failure has occurred (for example, when the value of the BFI_COUNTER exceeds the preset threshold) and there is no ongoing random access procedure initiated for beam failure recovery.

Optionally, the aforementioned random access procedure may be a random access procedure initiated for some other purpose, such as a random access initiated because of a "PDCCH order," or a random access initiated because of a handover, or a contention-based random access, etc.

Optionally, the foregoing random access procedure may also be a random access procedure initiated for any purpose.

For example, using the language in the MAC protocol, one implementation of the scheme above can be described as follows:

```
1> if beam failure instance indication has been recieved from lower layers; and
    2> start or restart the beamFailureDetectionTimer;
```

```
2> increment BFI_COUNTER by 1;
2> if BFI_COUNTER = beamFailureInstanceMaxCount + 1; and
2> if there is no ongoing Random Access procedure initiated for beam failure recovery:
     3> initiate a Random Access procedure (see subclause 5.1) on the SpCell by applying
        the parameters configured in BeamFailureRecoveryConfig.
1> if the beamFailureDetectionTimer expires:
   2> set BFI_COUNTER to 0.
1> if the Random Access procedure is successfully completed (see subclause 5.1):
   2> consider the Beam Failure Recovery procedure successfully completed.
```

Embodiment 2

In this embodiment, a MAC layer entity of UE may send a "beam failure instance activating instruction" or a "beam failure instance deactivating instruction" to a lower layer entity of the UE.

If such an indication is not received, a default behavior of the lower layer entity of the UE may be performing processing according to the "beam failure instance activating instruction," or may be performing processing according to the "beam failure instance deactivating instruction."

Optionally, a base station may also send the "beam failure instance activating instruction" or the "beam failure instance deactivating instruction" to the UE through RRC signaling.

Optionally, the base station may also send the "beam failure instance activating instruction" or the "beam failure instance deactivating instruction" to the UE through MAC CE signaling.

Optionally, the base station may also send the "beam failure instance activating instruction" or the "beam failure instance deactivating instruction" to the UE through DCI signaling.

The "beam failure instance activating instruction" indicates that the lower layer entity of the UE needs to indicate a beam failure instance to the MAC layer entity of the UE. In this case, the lower layer entity of the UE measures, according to the prior art, reference signals configured for beam failure detection, periodically detects whether the condition(s) for the beam failure instance is met, and indicates the beam failure instance to the MAC layer entity of the UE when the condition is met.

The "beam failure instance deactivating instruction" indicates that the lower layer entity of the UE does not need to indicate the beam failure instance to the MAC layer entity of the UE. In this case, the lower layer entity of the UE may still measure, according to the prior art, the reference signals configured for beam failure detection, and periodically detect whether the condition(s) for the beam failure instance is met, but does not indicate the beam failure instance to the MAC layer entity of the UE no matter whether the condition(s) is met or not. Optionally, the lower layer entity of the UE may not measure the reference signal configured for beam failure detection, or detect whether the condition(s) for the beam failure instance is met, nor indicate the beam failure instance to the MAC layer entity of the UE. Optionally, the lower layer entity of the UE may measure, according to the prior art, the reference signals configured for beam failure detection, but does not detect whether the condition(s) for the beam failure instance is met, nor indicate the beam failure instance to the MAC layer entity of the UE.

The condition(s) for the MAC layer entity of the UE to send the "beam failure instance activating instruction" to the lower layer entity of the UE may be one of the following conditions:

establishment of an RRC connection;
reestablishment of an RRC connection;
success in beam failure recovery (for example, a random access procedure initiated for beam failure recovery is successfully completed);
failure in beam failure recovery (for example, a random access procedure initiated for beam failure recovery cannot be successfully completed); and
receipt of a corresponding instruction from a higher layer.

Optionally, the condition for the MAC layer entity of the UE to send the "beam failure instance activating instruction" to the lower layer entity of the UE may be a combination of two or more of the above conditions.

Optionally, the lower layer entity of the UE may autonomously perform, when one of the above conditions is met, the action performed when the lower layer entity receives the indication of the "beam failure instance activating instruction" described in this embodiment of the present invention.

Optionally, the lower layer entity of the UE may autonomously perform, when a combination of two or more of the above conditions is met, the action performed when the lower layer entity receives the instruction of the "beam failure instance activating instruction" described in this embodiment of the present invention.

The condition for the MAC layer entity of the UE to send the "beam failure instance deactivating instruction" to the lower layer entity of the UE may be one of the following conditions:

establishment of an RRC connection;
reestablishment of an RRC connection;
success in beam failure recovery (for example, a random access procedure initiated for beam failure recovery is successfully completed);
failure in beam failure recovery (for example, a random access procedure initiated for beam failure recovery cannot be successfully completed); and
determination of occurrence of a beam failure (for example, when the value of the BFI_COUNTER exceeds the preset threshold);
receipt of a corresponding instruction from a higher layer.

Optionally, the condition for the MAC layer entity of the UE to send the "beam failure instance deactivating instruction" to the lower layer entity of the UE may be a combination of two or more of the above conditions.

Optionally, the lower layer entity of the UE may autonomously perform, when one of the above conditions is met, the action performed when the lower layer entity receives the instruction of the "beam failure instance deactivating instruction" described in this embodiment of the present invention.

Optionally, the lower layer entity of the UE may autonomously perform, when a combination of two or more of the above conditions is met, the action performed when the lower layer entity receives the instruction of the "beam failure instance deactivating instruction" described in this embodiment of the present invention.

For example, using the language in the MAC protocol, one implementation of the scheme above can be described as follows:

```
1> if beam failure instance indication has been recieved from lower layers:
    2> start or restart the beamFailureDetectionTimer;
    2> increment BFI_COUNTER by 1;
    2> if BFI_COUNTER = beamFailureInstanceMaxCount + 1:
        3> indicate deactivation of beam failure instance indication to lower layers.
        3> initiate a Random Access procedure (see subclause 5.1) on the SpCell by applying
            the parameters configured in BeamFailureRecoveryConfig;
1> if the beamFailureDetectionTimer expires:
    2> set BFI_COUNTER to 0.
1> if the Random Access procedure if successfully completed (see subclause 5.1):
    2> consider the Beam Failure Recovery procedure successfully completed.
    2> indicate activation of beam failure instance indication to lower layers.
```

Embodiment 3

In this embodiment, UE resets the BFI_COUNTER when a certain condition is met.

The condition for the UE to reset the BFI_COUNTER may be one of the following conditions:

establishment of an RRC connection;

reestablishment of an RRC connection;

success in beam failure recovery (for example, a random access procedure initiated for beam failure recovery is successfully completed);

failure in beam failure recovery (for example, a random access procedure initiated for beam failure recovery cannot be successfully completed); and determination of occurrence of a beam failure (for example, when the value of the BFI_COUNTER exceeds the preset threshold);

receipt of a corresponding instruction from a higher layer.

Optionally, the condition for the UE to reset the BFI_COUNTER may also be a combination of two or more of the above conditions.

For example, using the language in the MAC protocol, one implementation of the scheme above can be described as follows:

```
1> if beam failure instance indication has been received from lower layers:
    2> start or restart the beamFailureDetectionTimer;
    2> increment BFI_COUNTER by 1;
    2> if BFI_COUNTER = beamFailureInstanceMaxCount + 1:
        3> set BFI_COUNTER to 0;
        3> initiate a Random Access procedure (see subclause 5.1) on the SpCell by applying
            the parameters configured in BeamFailureRecoveryConfig;
1> if the beamFailureDetectionTimer expires:
    2> set BFI_COUNTER to 0.
1> if the Random Access procedure is successfully completed (see subclause 5.1):
    2> consider the Beam Failure Recovery procedure successfully completed.
```

For another example, using the language in the MAC protocol, one implementation of the scheme above can be described as follows:

```
1> if beam failure instance indication has been received from lower layers:
    2> start or restart the beamFailureDetectionTimer;
    2> increment BFI_COUNTER by 1;
    2> if BFI_COUNTER = beamFailureInstanceMaxCount + 1:
        3> initiate a Random Access procedure (see subclause 5.1) on the SpCell by applying
            the parameters configured in BeamFailureRecoveryConfig;
1> if the beamFailureDetectionTimer expires:
    2> set BFI_COUNTER to 0.
1> if the Random Access procedure is successfully completed (see subclause 5.1):
    2> set BFI_COUNTER to 0;
    2> consider the Beam Failure Recovery procedure successfully completed.
```

Embodiment 4

In this embodiment, a timer (i.e., beamFailureRecoveryTimer) is defined to monitor whether a "beam failure recovery procedure" is successful.

When a MAC layer entity of UE determines that a beam failure has occurred (for example, when the value of a BFI_COUNTER exceeds a preset threshold), the MAC layer entity starts the timer beamFailureRecoveryTimer.

In a random access procedure, during random access resource selection, if the MAC layer entity of the UE determines that the random access procedure is initiated for beam failure recovery, and cannot select a contention-free random access resource configured for beam failure recovery request (for example, because a measured value of a related reference signal such as an SSB or a CSI-RS cannot reach or exceed a preset threshold, a random access preamble cannot be selected from a random access preamble set configured for beam failure recovery request), the MAC layer entity of the UE stops the timer beamFailureRecoveryTimer.

Figure 3:
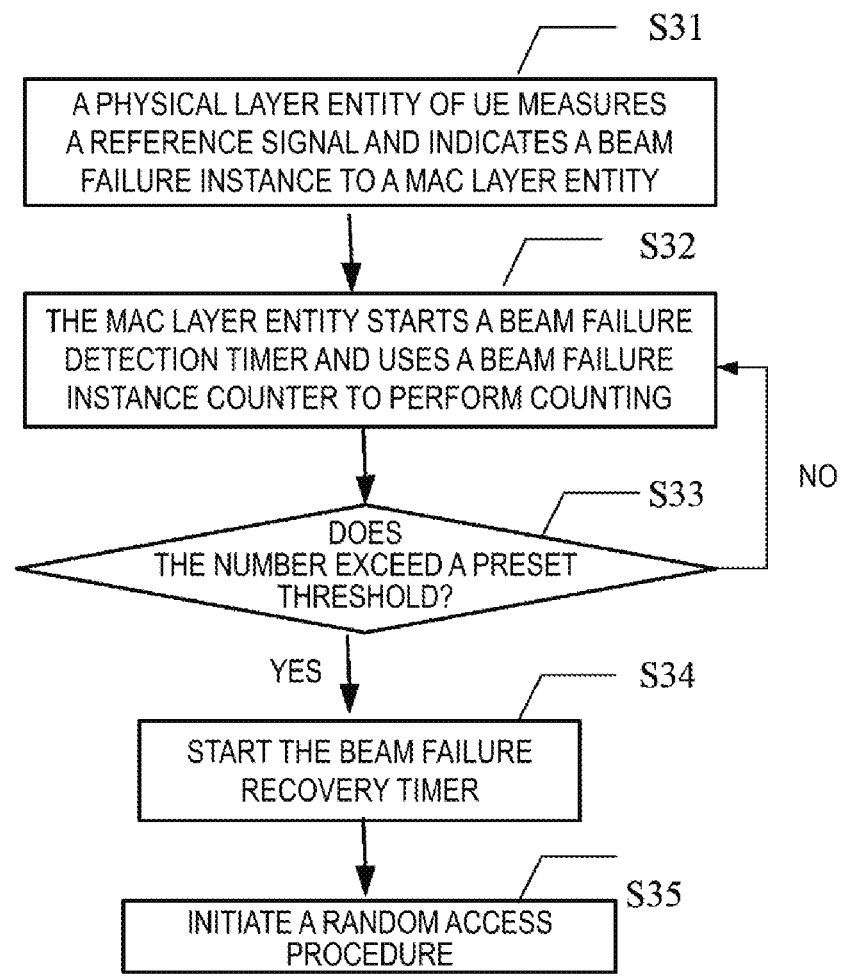
FIG. 3 is one example of a flowchart of a beam failure recovery method according to Embodiment 4 of the present invention.

FIG. 3 is one example of a flowchart of a beam failure recovery method according to Embodiment 4 of the present invention.

Steps S31 and S32 are the same as steps S1 and S2 in FIG. 1.

In step S33, it is determined whether the counted number exceeds a preset threshold, and if it exceeds the preset threshold (in the case of "Yes"), it is determined that a beam failure has occurred, and the process proceeds to step S34. When it is determined that the preset threshold is not exceeded (in the case of "No"), the process returns to step S32.

In step S34, the timer beamFailureRecoveryTimer is started.

In step S35, a random access procedure is initiated.

Figure 5:
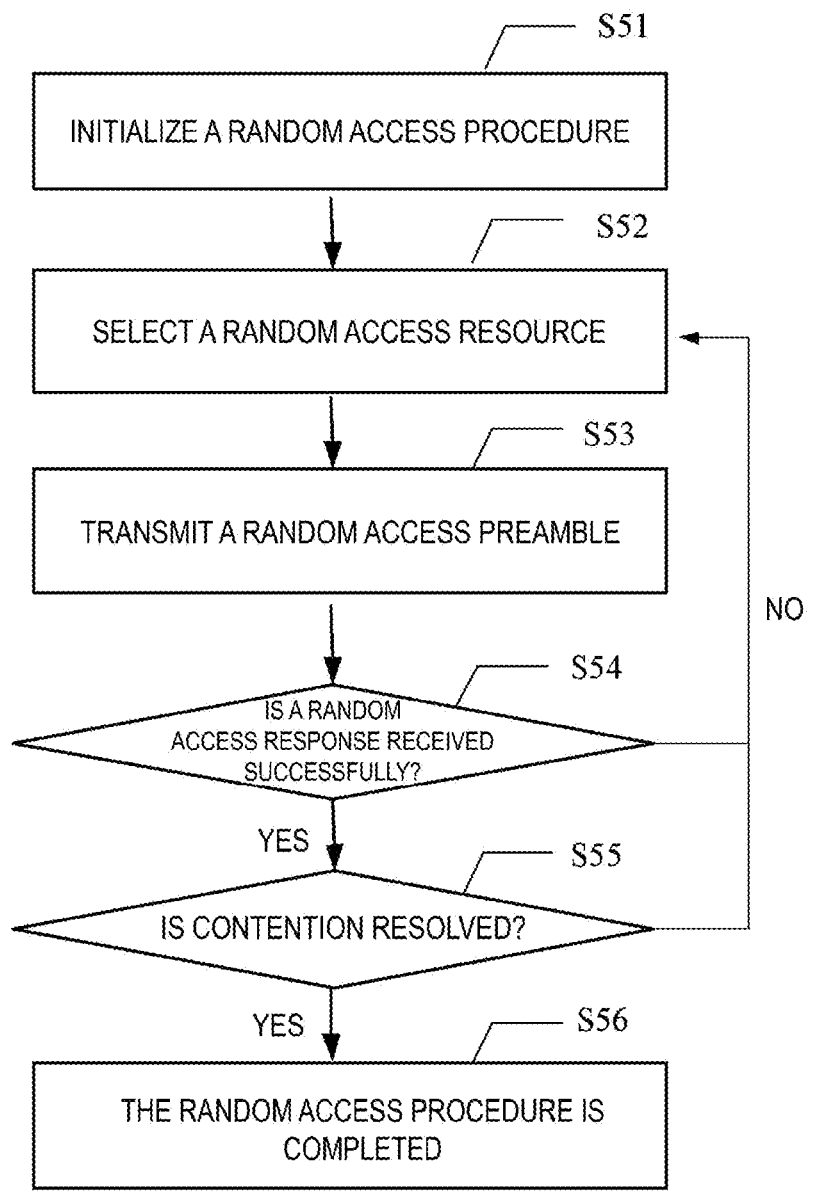
FIG. 5 is one example of a flowchart of a random access procedure in the prior art.

In the random access procedure initiated for beam failure recovery in Embodiment 4, the difference from the random access procedure in FIG. 5 of the prior art is that it is needed to determine whether the random access procedure is initiated for beam failure recovery and determine whether the UE selects a contention-free random access resource, and if the MAC layer entity of the UE determines that the random access procedure is initiated for beam failure recovery and the UE does not select a contention-free random access resource, the MAC layer entity of the UE stops the timer beamFailureRecoveryTimer.

Optionally, before stopping the timer beamFailureRecoveryTimer, the MAC layer entity of the UE may first determine whether the timer is running; the MAC layer entity of the UE stops the timer beamFailureRecoveryTimer only when the timer beamFailureRecoveryTimer is running.

The timer beamFailureRecoveryTimer is designed for a beam failure recovery procedure that employs a contention-free random access procedure. In this embodiment, in the random access procedure initiated for beam failure recovery, each time random access resource selection is performed, once the MAC layer entity of the UE cannot select a contention-free random access resource (in this case, according to the prior art, the MAC layer entity of the UE will select a contention-based random access resource), the MAC layer entity will stop the timer beamFailureRecoveryTimer. This can ensure that the timer beamFailureRecoveryTimer only functions in a contention-free random access procedure, preventing the timer beamFailureRecoveryTimer from affecting a contention-based random access procedure.

Figure 4:
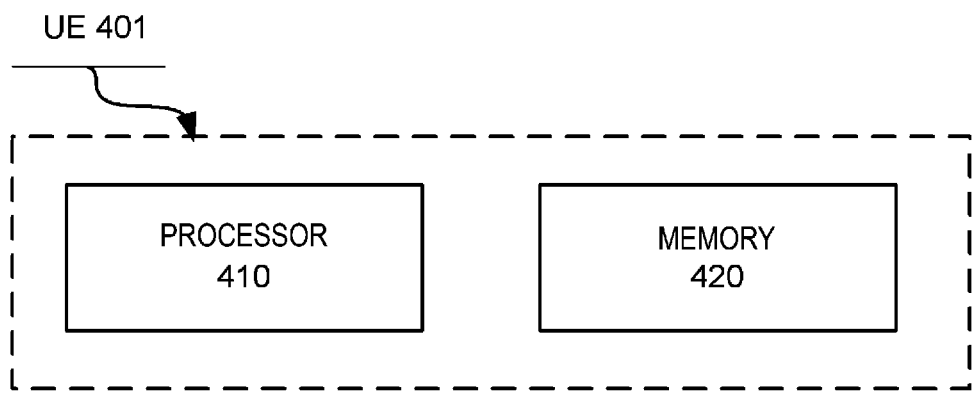
FIG. 4 is a block diagram of user equipment 50 according to an embodiment of the present disclosure.

FIG. 4 is a block diagram of user equipment 401 according to one embodiment of the present invention. As shown in FIG. 4, the user equipment 401 comprises a processor 410 and a memory 420. The processor 410 may include, for example, a microprocessor, a microcontroller, an embedded processor and so on. The memory 420 may include, for example, a volatile memory (for example, a Random Access Memory (RAM)), a Hard Disk Drive (HDD), a non-volatile memory (for example, a flash memory), or other memories. Program instructions are stored on the memory 420. The instructions, when executed by the processor 410, can perform the aforementioned method performed by the user equipment as described in detail in the present disclosure.

Each of the above-described examples and embodiments can be combined with each other if no contradiction is caused. For example, in Embodiment 3, when the MAC layer entity of the UE determines that a beam failure has occurred (for example, when the value of the BFI_COUNTER exceeds the preset threshold), the MAC layer entity resets the BFI_COUNTER. This operation can be combined with the second example described in the MAC language in Embodiment 1. That is, in this case, when the MAC layer entity of the UE determines that a beam failure has occurred, the MAC layer entity resets the BFI_COUNTER, but initiates a random access procedure only when another condition, i.e., "there is no ongoing random access procedure initiated for beam failure recovery" is also met. This scheme can be described as follows using the language in the MAC protocol:

```
1> if beam failure instance indication has been received from lower layers; and
    2> start or restart the beamFailureDetectionTimer;
    2> increment BFI_COUNTER by 1;
    2> if BFI_COUNTER = beamFailureInstanceMaxCount + 1:
        3> set BFI_COUNTER to 0;
        3> if there is no ongoing Random Access procedure initiated for beam failure recovery:
            4> initiate a Random Access procedure (see subclause 5.1) on the SpCell by
                applying the parameters configured in BeamFailureRecoveryConfig.
1> if the beamFailureDetectionTimer expires:
    2> set BFI_COUNTER to 0.
1> if the Random Access procedure is successfully completed (see subclause 5.1):
    2> consider the Beam Failure Recovery procedure successfully completed.
```

The methods and related devices according to the present invention have been described above in conjunction with the preferred embodiments. It should be understood by those skilled in the art that the methods shown above are only exemplary. The method of the present invention is not limited to steps or sequences illustrated above. The network node and the user equipment illustrated above may include more modules; for example, they may further include modules which can be developed or developed in the future to be applied to modules of a base station, an MME, or UE. Various identifiers shown above are only exemplary, and are not meant for limiting the present invention. The present invention is not limited to specific information elements serving as examples of these identifiers. Those skilled in the art can make various alterations and modifications according to the teachings of the illustrated embodiments.

It should be understood that the embodiments above of the present invention can be implemented by software, hardware or a combination of the software and the hardware. For example, various components inside the base station and the user equipment in the embodiments above can be implemented by various devices, and these devices include, but are not limited to: an analog circuit device, a digital circuit device, a Digital Signal Processor (DSP) circuit, a programmable processor, an Application Specific Integrated Circuit (ASIC), a Field Programmable Gate Array (FPGA), a Complex Programmable Logic Device (CPLD) and the like.

In the present application, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

Moreover, the embodiments of the present invention disclosed herein can be implemented on a computer program product. More particularly, the computer program product is a product as follows: a product having a computer readable medium encoded with computer program logic thereon, when being executed on a computing equipment, the computer program logic provides related operations to implement the technical solution of the prevent invention. When being executed on at least one processor of a computing system, the computer program logic enables the processor to execute the operations (methods) described in the embodiments of the present invention. Such setting of the present invention is typically provided as software, codes and/or other data structures provided or encoded on the computer readable medium, e.g., an optical medium (e.g., Compact Disc Read Only Memory (CD-ROM)), a flexible disk or a hard disk and the like, or other media such as firmware or micro codes on one or more Read Only Memory (ROM) or Random Access Memory (RAM) or Programmable Read Only Memory (PROM) chips, or a downloadable software image, a shared database and the like in one or more modules. The software or the firmware or such configuration can be installed on the computing equipment, so that one or more processors in the computing equipment execute the technical solution described in the embodiments of the present invention.

In addition, each functional module or each feature of the base station device and the terminal device used in each of the above embodiments may be implemented or executed by a circuit, which is usually one or a plurality of integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges due to advances in semiconductor technology, the present invention may also use integrated circuits obtained using this advanced technology.

Although the present invention is already illustrated above in conjunction with the preferred embodiments of the present invention, those skilled in the art should understand that, without departing from the spirit and scope of the present invention, various modifications, replacements and changes can be made to the present invention. Therefore, the present invention should not be defined by the above embodiments, but should be defined by the appended claims and equivalents thereof.

The invention claimed is:

1. A method performed by a user equipment (UE), the method comprising:
   receiving beam failure instance indication from lower layers;
   starting or restarting a beamFailureDetectionTimer;
   incrementing a BFI_COUNTER by 1, the BFI_COUNTER being a counter for a beam failure instance indication;
   initiating a Random Access procedure for beam failure recovery on a basis of a value of the BFI COUNTER;
   resetting the BFI_COUNTER to 0 in response to determining that the beamFailureDetectionTimer has expired;
   resetting the BFI_COUNTER to 0 with regard to the Random Access procedure for beam failure recovery in response to determining that the Random Access procedure for beam failure recovery is successfully completed; and
   forgoing resetting the BFI COUNTER to 0 with regard to the Random Access procedure for beam failure recovery in response to determining that the Random Access procedure for beam failure recovery is not successfully completed.

2. A user equipment (UE), comprising:
   at least one processor; and
   at least one non-transitory computer-readable medium coupled to the at least one processor and storing one or more computer-executable instructions that, when executed by the at least one processor, cause the UE to:
   receive beam failure instance indication from lower layers;
   start or restart a beamFailureDetectionTimer;
   increment a BFI COUNTER by 1, the BFI_COUNTER being a counter for a beam failure instance indication;
   initiate a Random Access procedure for beam failure recovery on a basis of a value of the BFI COUNTER;
   reset the BFI COUNTER to 0 in response to determining that the beamFailureDetectionTimer has expired;
   reset the BFI COUNTER to 0 with regard to the Random Access procedure for beam failure recovery in response to determining that the Random Access procedure for beam failure recovery is successfully completed; and
   forgo resetting the BFI COUNTER to 0 with regard to the Random Access procedure for beam failure recovery in response to determining that the Random Access procedure for beam failure recovery is not successfully completed.

\* \* \* \* \*